*US008630728B2*

United States Patent
Murphy et al.

(10) Patent No.: US 8,630,728 B2
(45) Date of Patent: Jan. 14, 2014

(54) SYSTEM AND METHOD FOR GENERATING INDICES TO QUANTIFY OPERATING TRANSITION PERFORMANCE OF A CONTINUOUS PROCESS

(75) Inventors: Timothy F. Murphy, Columbus, OH (US); Kevin Starr, Lancaster, OH (US); Timothy A. Mast, Plain City, OH (US)

(73) Assignee: ABB Technology AG, Zurich (CH)

( * ) Notice: Subject to any disclaimer, the term of this patent is extended or adjusted under 35 U.S.C. 154(b) by 392 days.

(21) Appl. No.: 13/015,705

(22) Filed: Jan. 28, 2011

(65) Prior Publication Data

US 2012/0197426 A1    Aug. 2, 2012

(51) Int. Cl.
*G06F 19/00* (2011.01)

(52) U.S. Cl.
USPC ............ 700/108; 700/109; 700/101; 700/128

(58) Field of Classification Search
USPC .......................................... 700/108–110, 128
See application file for complete search history.

(56) References Cited

U.S. PATENT DOCUMENTS

| | | | |
|---|---|---|---|
| 6,473,670 B1 * | 10/2002 | Huhtelin ....................... | 700/128 |
| 6,640,152 B1 * | 10/2003 | Chen et al. ................... | 700/128 |
| 6,885,907 B1 | 4/2005 | Zhang et al. .................. | 700/146 |
| 6,904,331 B2 * | 6/2005 | Sasaki et al. .................. | 700/128 |
| 7,050,879 B1 * | 5/2006 | Wang et al. ................... | 700/121 |
| 7,346,404 B2 * | 3/2008 | Eryurek et al. ................ | 700/65 |
| 7,846,299 B2 * | 12/2010 | Backstrom et al. ........... | 162/253 |
| 7,881,815 B2 * | 2/2011 | Srinivasan et al. ............. | 700/31 |
| 8,036,760 B2 * | 10/2011 | Mehta et al. .................... | 700/29 |
| 2002/0104636 A1 | 8/2002 | Sasaki et al. .................. | 162/263 |
| 2003/0149613 A1 * | 8/2003 | Cohen et al. .................... | 705/11 |
| 2006/0191993 A1 * | 8/2006 | Markham et al. .............. | 235/376 |
| 2007/0078533 A1 * | 4/2007 | Caldwell et al. ................ | 700/37 |
| 2007/0198104 A1 * | 8/2007 | Sayyarrodsari et al. ........ | 700/44 |
| 2008/0264591 A1 * | 10/2008 | Backstrom et al. ........... | 162/202 |
| 2009/0043546 A1 * | 2/2009 | Srinivasan et al. ............. | 703/2 |
| 2009/0112335 A1 * | 4/2009 | Mehta et al. .................... | 700/29 |

OTHER PUBLICATIONS

"Time-Optimal Control of MMA-MA Copolymerization in a CSTR for Grade Change" Kim et al; Korean J. Chem. Eng.; 15; Jan. 31, 1998, pp. 45-50; XP55022845.
"Paper machine Fingerprint Identify opportunities for machine performance improvement" ABB Inc.; Dec. 31, 2009, pp. 1-2, XP55022905.
International Search Report mailed May 8, 2012 in corresponding International Patent Application No. PCT/US2012/022629.
"Reducing Grade Change Time Through the Use of Predictive Multi-Variable Control" McQuillin et al; Control Systems 94, Stockholm, Sweden, pp. 275-281, 1994.

(Continued)

*Primary Examiner* — Michael D Masinick
(74) *Attorney, Agent, or Firm* — Renner Kenner Greive Bobak Taylor & Weber

(57) ABSTRACT

A system and method for generating indices to quantify operating transition performance of a continuous process, such as a sheet forming process, includes a computer system that is configured to generate a normalized overall transition performance index. The overall transition performance index is formed from a plurality of individual parameter indices associated with specific production components or portions of the process line. As such, the individual parameter indices allow a user of the system to readily identify the particular portion of the continuous process line that is performing below desired levels. In addition, because the overall transition performance index is normalized, it enables comparison of the operating transition performance of multiple process lines.

29 Claims, 1 Drawing Sheet

(56) References Cited

OTHER PUBLICATIONS

"*Transition Control of Paper-making Processes: Paper Grade Change*" Murphy et al; 1999 IEEE CCA and CACSD Conference, Kohola Coast, HI, Aug. 22-27, 1999, pp. 1278-1283.

"*Reducing Production Loss From Paper Grade Change*" Murphy et al; TAPPI 2000 Process Control, Electrical and Information Conf., Williamsburg, VA, Mar. 26-30, 2000, pp. 175-181.

"*Fast Grade Change for Paper Making Processes*" Murphy et al; Proceeding of Control Systems 2000, Victoria, British Columbia, May 1-4, pp. 189-192, 2000.

"*Quantifying Paper Machine Transition Performance*" Murphy et al; 2008 PAPERCON Conference, May 2008.

*Automatic Grade Change* ABB, Inc. Proprietary Data—Technical manual 3 BUS 208 111 R0501, Aug. 1996, pp. 173-205.

\* cited by examiner

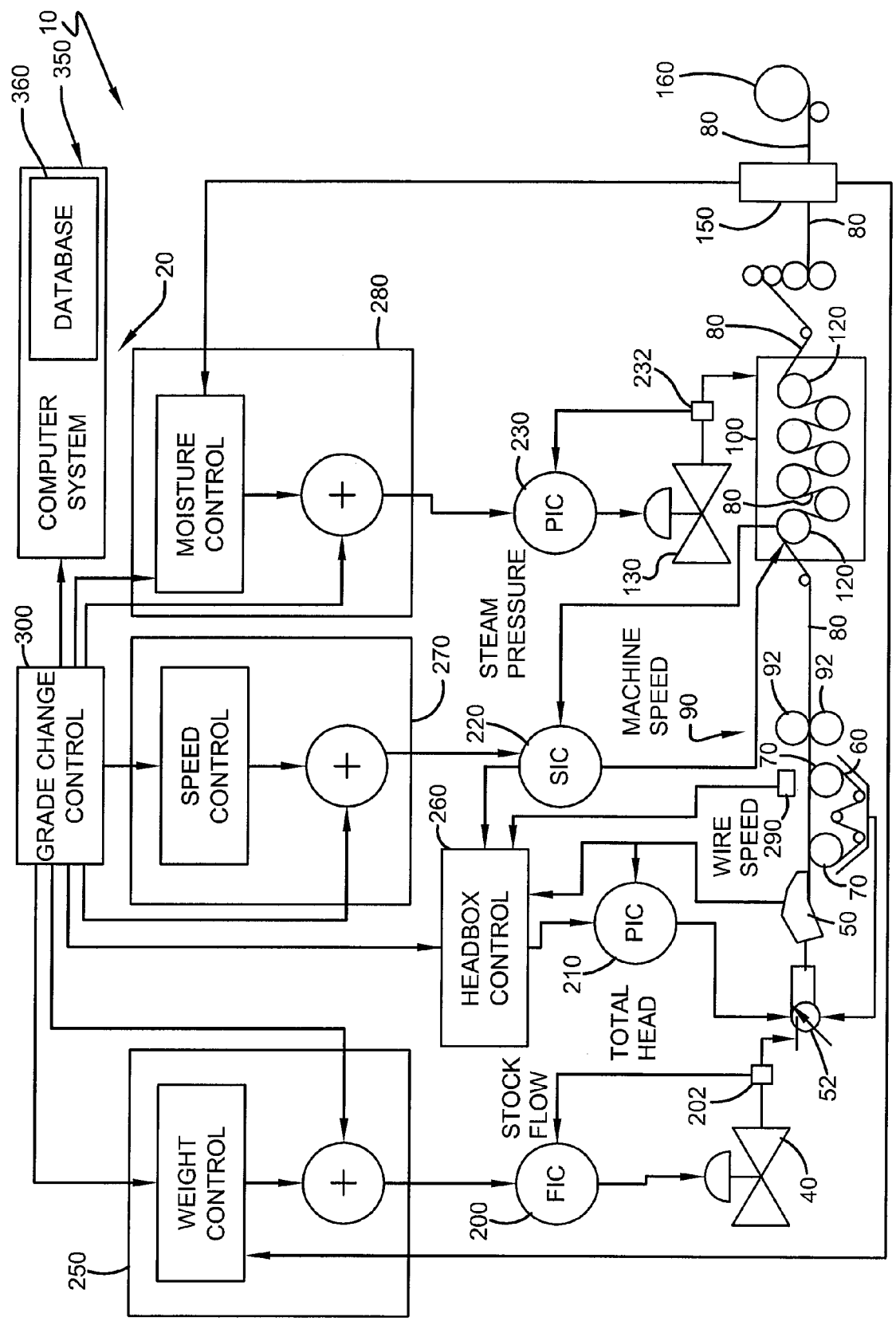

SYSTEM AND METHOD FOR GENERATING INDICES TO QUANTIFY OPERATING TRANSITION PERFORMANCE OF A CONTINUOUS PROCESS

TECHNICAL FIELD

Generally, the present invention relates to continuous processes, such as a sheet forming process. Particularly, the present invention relates to a system and method to determine performance of an operating transition of a continuous process. More particularly, the present invention relates to a system and method for generating indices to quantify the performance of an operating transition of a continuous process.

BACKGROUND ART

In the case of process controls for a continuous process, such as sheet forming processes, product quality parameters are focused on the period of time in which a particular "grade" of product is produced. A "grade" identifies a set of product specifications, such as sheet weight, sheet caliper, sheet brightness, and sheet color, for example. However, after a period of time, it may be desired that the specifications of the product, such as the sheet, be changed. The process in which the process line, which is initially configured to produce sheets of one specification, is transitioned to produce sheets of another specification is referred to as a grade change or operating transition. The grade change or operating transition is carried out by a transition control system that is interfaced with the various control systems. Specifically, the transition control system automates the operational set points of various functional components of the continuous process to ensure the product is produced in accordance with the new product specification identified by the grade change or operating transitions and that the process is achieving the desired grade change or operating transition.

While steady-state control processes are well-established and key performance indicators (KPI) are available to monitor their operation, such key performance indicators provide inadequate performance data when used to quantify the performance of operating transitions of a continuous process. For example, one manner for quantifying the performance of an operating transition or grade change is by monitoring the transition time required to complete the transition from one grade to another. However, transition time provides inadequate performance data and does not provide a complete and/or accurate assessment of the overall performance of the operating transition. Furthermore, because a continuous process requires producing products, such as sheets, that during the operating transition do not meet final production specifications, a substantial amount of production time and product waste can occur if the operating transition is not carried out in an optimized manner.

Therefore, there is a need for a system and method that generates a set of indices to quantify operating transition or grade change performance of a continuous process. In addition, there is a need for a system and method that generates multiple normalized performance indices associated with various parameters of the continuous process that take place during an operating transition or grade change, to enable comparison of grade change performance between multiple process lines. Furthermore, there is a need for a system and method to quantify the performance of one or more specific portions of a continuous process during the operating transition to readily identify specific portions of the process that are not attaining desired performance levels.

SUMMARY OF INVENTION

In light of the foregoing, it is a first aspect of the present invention to provide a system for generating performance indices to quantity operating transition performance of a continuous process.

It is another aspect of the present invention to provide a system for generating performance indices to quantify operating transition performance of a continuous process, which includes a system for generating a performance index to quantify operating transition performance of a continuous process line that is carried out by a grade change control comprising a database adapted to store at least one performance parameter stored thereon that is associated with an operating transition carried out by the grade change control during a transition time period, and a computer system coupled to the database, the computer system configured to generate a transition performance index based on the at least one operating parameter.

Still another aspect of the present invention is to provide a method for generating a performance index to quantify operating transition performance of a continuous process that is carried out by a grade change control, the method comprising providing a computer system, acquiring at least two performance indices at the computer system, the performance indices selected from the group consisting of a transition time index, a sheet weight ramp rate index, a sheet weight change index, a line speed change index, a steam prediction error index, and a moisture deviation index, weighting each of the at least two indices by a weight value, and summing the at least two performance indices to generate an operating transition performance index.

BRIEF DESCRIPTION OF THE DRAWINGS

These and other features and advantages of the present invention will become better understood with regard to the following description, appended claims, and accompanying drawings wherein:

FIG. 1 is a block diagram showing a continuous process line and computer system configured to generate operating transition performance indices in accordance with the concepts of the present invention.

DETAILED DESCRIPTION OF THE INVENTION

A system and method for generating indices to quantify operating transition performance of a continuous process or production line 10, is generally referred to by numeral 20, as shown in FIG. 1. The continuous process line 10 may comprise any process, in which the process or production line is continuously operated during a change or transition in one or more of the product specifications of the product being manufactured. However, for the purposes of the following discussion, the continuous process line 10 relates to a process for forming sheets, such as paper sheets.

The sheet forming process carried out by the production line 10 includes various functional production components, which include but are not limited to a stock flow control valve 40 that controls the amount of wet stock, such as wet paper or pulp stock, to be delivered to a headbox 50 that is moved by a headbox fan pump actuator 52. The headbox 50 delivers the wet stock at a specific velocity or rate to a screen or wire 60 that is moved by a plurality of wire turning rolls 70 to form a continuous sheet of material, or stock sheet 80. The stock sheet 80 is then picked off of the screen 60 and carried into a press section 90, which comprises a plurality of press rolls 92 that compress the stock sheet 80 to expel excess water from the sheet. Next, the compressed stock sheet 80 is carried into a drying section 100, which is formed of a plurality of drying rolls 120 that are heated from the inside by superheated steam which is pressure controlled by a steam valve 130. Skilled artisans will appreciate that other drying configurations could be used. The speed at which the sheet 80 is moved through the process line 10 is controlled by the drying rolls 120 which are driven by any suitable drive mechanism, such as an electric motor. As the stock sheet 80 exits the drying section 100, the dried and finished stock sheet 80 passes through a series of rollers and then a sheet analysis sensor 150 that is configured to measure various physical properties of the sheet 80, including, among other things, its thickness and weight. Once the stock sheet 80 has been analyzed, it is then gathered on a winder 160, whereupon it is stored or transported for subsequent processing.

In order to maintain the operation of the production components of the process line 10 at target values, feedback indicator controls are utilized. Specifically, a flow indicator control 200 is coupled to the stock flow valve 40 and associated flow rate sensor 202. The flow rate sensor 202 provides feedback information related to the stock flow to the control 200. A headbox pressure indicator control 210 is coupled to the headbox fan pump actuator 52 and the headbox 50. A speed indicator control 220 is coupled to the drying rolls 120, and a pressure indicator control 230 is coupled to the steam valve 130 and associated steam pressure sensor 232. As such, the indicator controls 200-230 provide low-level feedback control over various processes carried out by the process line 10, whereby the stock flow indicator control 200 provides control over the stock flow rate; the headbox pressure indicator control 210 provides control over the headbox 50 velocity via the headbox fan pump actuator 52; the speed indicator control 220 provides control over the drying section roll 120 speed; and the pressure indicator control 230 provides control over the steam pressure volume. The operating set points that define the operating specifications of the production components, which are utilized by the indicator controls 200-230, are established by supervisory or regulatory controls, discussed below that oversee the operation of the indicator controls 200-230.

Regulatory or supervisory controls are provided by the process line 10 to generally monitor all of the various sensors provided in the process line 10 and generate signals that are sent to the various indicator controls 200-230. Skilled artisans will appreciate that each supervisory control to be described includes the appropriate hardware, software, and memory for receiving the specific data inputs and generating appropriate data outputs. The regulatory and supervisory controls include a weight control 250 to control the weight of the finished sheet product produced by the process line 10; a headbox control 260 to control the velocity at which the stock is delivered from the headbox 50 and the wire screen 60; a speed control 270 to control the speed of the drying rolls 120 that carry the stock sheet 80; and a moisture control to control the moisture content of the finished sheet 80. Specifically, the regulatory or supervisory controls 250-280 are coupled to the indicator controls 200-230, such that the weight control 250 is connected to the flow indicator control 200. In a similar manner, the headbox control 260 is connected to the headbox pressure indicator control 210, the speed control 270 is connected to the speed indicator control 220, and the moisture control 280 is connected to the pressure indicator control 230. In addition, the weight control 250 also receives feedback from the sheet analysis sensor 150; the headbox control 260 receives feedback from the headbox 50, the speed indicator sensor 220, and from a wire speed sensor 290 that monitors the speed of the wire turning rolls 70; and the moisture control 280 receives feedback from the sheet analysis sensor 150.

Coupled to the weight control 250, the headbox control 260, the speed control 270, and the moisture control 280 is a grade change control 300 that is configured to transfer the process line 10 during the grade change from one set of target values to a new set in an optimized manner so as produce a product with new specifications. Specifically, the grade change control 300 defines the trajectories of the sheet product target values and the trajectories of the current low-level set points of the production components and correlates them through a process model of the process line 10. As used herein, the target values refer to the desired properties of the sheet upon completion of the sheet's changeover to a desired grade. And the set points refer to operating parameters of low-level components in the process line needed to obtain the target values. Upon setting of the trajectories, the grade change control 300 then generates incremental adjustment values that are summed with the set point values established by the weight control 250, the speed control 270, and the moisture control 280. Moreover, the grade change control 300 performs the transition in an optimized manner, to accommodate various constraints, such as time, material and energy waste for example, that result during a change in the specifications of the sheet.

However, to monitor the performance of the grade change that has been carried out by the process line 10 by the grade change control 300, the system 20 generates an operating transition performance index or value to be discussed in detail below.

The operating transition performance index or value is a weighted combination of individual operating transition parameter indices that quantify the operational performance of the various production components of the process line 10, as well as the specifications of the finished sheet product 80 that occur during the grade change. That is, the parameter indices are generated from performance data and/or operation data associated with process line 10 and the sheet 80 while the process line 10 completes a grade change or operating transition. Specifically, the parameter indices or values include a transition time index, a sheet weight ramp rate index, an overall sheet weight change index, an overall line speed change index, a steam pressure prediction error index, and a maximum sheet moisture deviation index. Thus, by providing multiple parameter indices, each associated with the performance of a specific production component of the process line 10 or the product 80, analysis and diagnostic efforts are enhanced, as the parameter indices readily identify the portion of the process line 10 that is not attaining the desired level of performance. Furthermore, the operating transition performance index enables the comparison of grade changes or operating transitions between multiple process lines.

The performance indices and overall performance index are calculated or generated by the system 20 via a computer system 350, which may comprise any suitable computing device, such as a standalone or desktop computer, configured to calculate or compute the equations that define the overall transition performance index and associated indices to be discussed. Alternatively, the computer system 350 may be coupled to the grade change control 300 directly to acquire various data utilized in the calculation of the parameter indices or may be coupled to the components of the process line 10 directly. It should also be appreciated that the computer system 350 is configured to maintain a database 360 of past or historical performance and/or operating data, specifications, or parameters associated with the operation of the process line 10 and the sheet 80, as well as for various other process lines and sheets. Thus, based on such data, the system 20 is able to calculate the individual parameter indices and overall performance index, which are presented in detail in the discussion below.

A. Overall Transition Performance Index

The overall transition performance index used to quantify the overall performance of an operating transition or grade change is set forth as follows:

OverallTransitionPerformanceIndex=$w_1$(TransitionTimeIndex)+$w_2$(SheetWeightRampRateIndex)+$w_3$(SheetWeightChangeIndex)+$w_4$(LineSpeedChangeIndex)+$w_5$(SteamPredictionErrorIndex)+$w_6$(MoistureDeviationIndex). (A)

Specifically, the overall transition performance index is comprised of the sum of one or more weighted parameter indices that include: Transition Time Index, Sheet Weight Ramp Rate Index, Sheet Weight Change Index, Line Speed Change Index, Steam Prediction Error Index, and Moisture Deviation Index. Furthermore, the overall transition performance index A is normalized to a unit-less value between 1 and 0, while weighting factors or values $w_i$ are attributed a numerical value that is relative to the level of importance of each performance parameter indice. However, it should be appreciated that in one aspect that the sum of the weighting factors $w_i$ of the transition performance index equal 1, while the value of each of the parameter indices discussed is normalized to be within a range of 0 to 1, so as to provide uniformity when multiple overall transition performance indices A are compared.

Thus, with the discussion of the overall transition performance index set forth, a discussion of the individual parameter indices from which it is derived are set forth below.

B. Transition Time Index

The transition time index is a parameter indice, which quantifies the amount of time required for the process line 10 to transition from initial product specifications to a point when all identified measurements of the product, such as the stock sheet 80, fall within the new product specifications established by the grade change or operating transition. Moreover, the operating transition time index is a normalized, unit-less quantity that is between 1 and 0, and is defined by the following equations:

TransitionTimeIndex= (B)
 Max{Min[(*MeasuredTime*)(*TransitionTimeGain*) + *TransitionTimeBias*, 1]0}

$$TransitionTimeGain = \frac{(MaxTimeIndex - MinTimeIndex)}{(MinDesiredTime - MaxDesiredTime)}$$ (C)

TransitionTimeBias = [*MaxTimeIndex* − (*MinDesiredTime*)(*TransitionTimeGain*)]. (D)

The MeasuredTime variable, also referred to herein as the transition time, is defined as the actual amount time measured from the start of the operating transition or grade change to a point when all identified product measurements are within the new product specification defined by the operating transition or grade change. Furthermore, the TransitionTimeGain C is defined as the desired change in the transition time index per increase in transition time (e.g. index increases by 0.1 for every 5 minute decrease of the transition time is a slope of −0.02), while the TransitionTimeBias D is defined as the value of the transition time index for the minimum transition time.

The MaxDesiredTime variable and the MinDesiredTime variable, from which the TransitionTimeGain C and the TransitionTimeBias D are derived, define the respective maximum and minimum desired transition times. Specifically, the MaxDesiredTime and MinDesiredTime values are acquired from historical data of one or more past grade changes performed by the process line 10, which are stored at the database 360 of the computer system 350. In another aspect, the MaxDesiredTime and the MinDesiredTime can be entered directly into the computer system 350 or acquired in an automated manner from the grade change controller control 300. In addition, the MaxTimeIndex variable and the MinTimeIndex variable identify the range of the TransitionTimeIndex variable that is between the maximum and minimum transition time and is normally set such that the MaxTimeIndex variable is equal to 1 and the MinTimeIndex variable is equal to 0, so as to normalize the value of the TransitionTimeIndex B.

The MaxDesiredTime variable and the MinDesiredTime variable, from which the TransitionTimeGain C and the TransitionTimeBias D are derived, define the respective maximum and minimum desired transition times. Specifically, the MaxDesiredTime and MinDesiredTime values are acquired from historical data of one or more past grade changes performed by the process line 10, which are stored at the database 360 of the computer system 350. In another aspect, the MaxDesiredTime and the MinDesiredTime can be entered directly into the computer system 350 or acquired in an automated manner from the grade change controller 300. In addition, the MaxTimeIndex variable and the MinTimeIndex variable identify the range of the TransitionTimeIndex variable that is between the maximum and minimum transition time and is normally set such that the MaxTimeIndex variable is equal to 1 and the MinTimeIndex variable is equal to 0, so as to normalize the value of the TransitionTimeIndex B.

C. Sheet Weight Ramp Rate Index

The sheet weight ramp rate index is a parameter indice, which quantifies the rate at which the process line 10 changes the weight of the sheet 80 from an initial product specification during the transition time period. Moreover, the sheet weight ramp rate index is normalized to a unit-less quantity between 1 and 0, and is defined by the following equations:

WeightRampRateIndex= (E)
 Max{Min[(*MeasuredWeightRampRate*)(*WeightRampRateGain*) + *WeightRampRateBias*, 1], 0}

$$WeightRampRateGain = \frac{(MaxWeightRampRateIndex - MinWeightRampRateIndex)}{(MaxDesiredWeightRampRate - MinDesiredWeightRampRate)}$$ (F)

WeightRampRateBias = [*MinWeightRampRateIndex* − (*MinDesiredWeightRampRate*)(*WeightRampRateGain*)]. (G)

The MeasuredWeightRampRate is defined as the actual weight change of the sheet 80 that has occurred during the transition time period. Furthermore, the WeightRampRateGain F is defined as the desired change in the weight ramp rate index per increase in actual weight ramp rate, while the WeightRampRateBias G defines the value of the weight ramp rate index when the weight ramp rate is at the minimum weight ramp rate.

The MaxDesiredWeightRampRate and the MinDesiredWeightRampRate from which the WeightRampRateGain F and the WeightRampRateBias G are derived, define the respective maximum and minimum desired weight ramp rates based on historical data of one or more past grade changes performed by the process line 10 stored at the database 360 of the computer system 350. In one aspect, the MaxDesiredWeightRampRate and MinDesiredWeightRampRate can be entered directly into the computer system 350 or acquired in an automated manner from the grade change control 300. In addition, the MaxWeightRampRateIndex and the MinWeightRampRateIndex identify the range of the WeightRampRateIndex that is between respective maximum and minimum weight ramp rate indices, and is normally set such that the MaxWeightRampRateIndex variable is equal to 1 and the MinWeightRampRateIndex is equal to 0, so as to normalize the value of the WeightRampRate Index E.

D. Sheet Weight Change Index

The sheet weight change index is a parameter indice, which quantifies the change in magnitude of the weight of the sheet 80 produced by the process line 10 that occurs during the transition time period. Moreover, the sheet weight change index is normalized to a unit-less quantity between 1 and 0, and is defined by the following equations:

$$WeightChangeIndex = \tag{H}$$
$$\text{Max}\{\text{Min}[(MeasuredWeightChange)(WeightChangeGain) + WeightChangeBias, 1], 0\}$$

$$WeightChangeGain = \frac{(MaxWeightChangeIndex - MinWeightChangeIndex)}{(MaxDesiredWeightChange - MinDesiredWeightChange)} \tag{I}$$

$$WeightChangeBias = [MinWeightChangeIndex - (MinDesiredWeightChange)(WeightChangeGain)]. \tag{J}$$

The MeasuredWeightChange is the actual weight change that is defined by the difference in magnitude between the active (before) and preliminary (after) sheet 80 weights that occurs during the transition time period. Furthermore, WeightChangeGain I is defined as the change in the weight change index per increase in actual weight change, while WeightChangeBias J is defined as the value of the weight change index when the actual weight change is at the minimum weight ramp rate.

The MaxDesiredWeightChange and the MinDesiredWeightChange, from which the WeightChangeGain and the WeightChangeBias are derived, are defined as the respective maximum and minimum desired weight change and are acquired from historical data stored at the database 360 of the computer system 350 of one or more past grade changes performed by the process line 10. In one aspect, the MaxDesiredWeightChange and the MinDesiredWeightChange can be entered directly into the computer system 350 or acquired in an automated manner from the grade change control 300. In addition, the MaxWeightChangeIndex and the MinWeightChangeIndex identify the range of respective maximum and minimum weight change indices for the sheet weight change performance index and is normally set such that the MaxWeightChangeIndex variable is equal to 1 and the MinWeightChangeIndex variable is equal to 0, so as to normalize the value of the WeightChangeIndex H.

E. Line Speed Change Index

The line speed change index is a parameter indice, which quantifies the change in magnitude of the line speed, or speed at which the sheet 80 is moved through the process line 10, that occurs during the transition time period. Moreover, the line speed change index is normalized to a unit-less quantity between 1 and 0, and is defined by the following equations:

$$LineSpeedChangeIndex = \tag{K}$$
$$\text{Max}\{\text{Min}[(MeasuredSpeedChange)(SpeedChangeGain) + SpeedChangeBias, 1], 0\}$$

$$SpeedChangeGain = \frac{(MaxSpeedChangeIndex - MinSpeedChangeIndex)}{(MaxDesiredSpeedChange - MinDesiredSpeedChange)} \tag{L}$$

$$SpeedChangeBias = [MinSpeedChangeIndex - (MinDesiredSpeedChange)(SpeedChangeGain)]. \tag{M}$$

The MeasuredSpeedChange variable identifies the actual speed change that is defined by the difference in magnitude between the active (current grade) and preliminary (new grade) speed set point at which the sheet 80 moves through the process line 10 during the transition time period. Furthermore, the SpeedChangeGain L identifies the desired change in the process line speed index per increase in actual process line speed change, while the SpeedChangeBias M defines the value of the line speed change index when the actual process line speed change is at the minimum speed change.

The MaxDesiredSpeedChange and the MinDesiredSpeedChange, from which the SpeedChangeGain L and SpeedChangeBias M are derived, define the respective maximum and minimum desired line speed change and are acquired from historical data stored at the database 360 of the computer system 350 of one or more past grade changes performed by the process line 10. In one aspect, the MaxDesiredSpeedChange and the MinDesiredSpeedChange can be entered directly into the computer system 350 or acquired in an automated manner from the grade change control 300. Moreover, the MaxSpeedChangeIndex and the MinSpeedChangeIndex identify the range of the LineSpeedChangeIndex that is between respective maximum and minimum speed change indices and are normally set such that the MaxSpeedChange Index variable is 1 and the MinSpeedChangeIndex is 0, so as to normalize the value of the LineSpeedChangeIndex K.

F. Steam Prediction Error Index

The steam prediction error index is a parameter indice, which quantifies the difference in the magnitudes of the actual new grade steady-state steam pressure operating set point established by the grade change or operating transition specification used by the pressure indicator control 230, and a predicted steam pressure value that is established by the grade change controller 300. Moreover, the steam prediction error index is normalized to a unit-less quantity between 1 and 0, and is defined by the following equations:

$$SteamPredictionErrorIndex = \tag{N}$$
$$\text{Max}\{\text{Min}[(MeasureSteamPredictionError)(SteamPredictionErrorGain) + SteamPredictionErrorBias, 1], 0\}$$

$$SteamPredictionErrorGain = \frac{(MaxSteamPredictionErrorIndex - MinSteamPredictionErrorIndex)}{(MinDesiredSteamPredictionError - MaxDesiredSteamPredictionError)} \tag{O}$$

-continued $$SteamPredictionErrorBias = [MaxSteamPredictionErrorIndex - \quad (P)$$
$$(MinDesiredSteamPredictionError)$$
$$(SteamPredictionErrorGain)].$$

The MeasuredSteamPredictionError variable identifies the actual steam pressure prediction error, which is defined by the difference in magnitude between the actual new grade steady state steam pressure process value and the predicted steam pressure value established by the grade change control 300 that occurs during the transition time period. Furthermore, the SteamPredictionErrorGain O identifies the desired change in the steam prediction error index per increase in actual steam prediction error, while the SteamPredictionErrorBias P defines the value of the steam prediction error index when the actual steam prediction error is at the minimum steam prediction error.

In addition, the MaxDesiredSteamPredictionError and the MinDesiredSteamPredictionError, from which the SteamPredictionErrorGain and SteamPredictionErrorBias are derived, define the respective maximum and minimum desired steam pressure prediction error and are acquired from historical data stored at the database 360 of one or more past grade changes performed by the process line 10. In one aspect, the MaxDesiredSteamPredictionError and the MinDesiredSteamPredictionError can be entered directly into the computer system 350 or acquired in an automated manner from the grade change control 300. In addition, the MaxSteamPredictionErrorIndex and the MinSteamPredictionErrorIndex identify the range of the SteamPredictionErrorIndex that is between respective maximum and minimum steam pressure prediction error indices, and is normally set such that the MaxSteamPredictionErrorIndex variable is 1 and the MinSteamPredictionErrorIndex variable is equal to 0, so as to normalize the value of the SteamPredictionErrorIndex N.

G. Moisture Deviation Index

The moisture deviation index is a parameter indice, which quantifies the magnitude of the maximum moisture deviation from a target value established by the grade change or operating transition specification that occurs during the transition time period. Moreover, the moisture deviation index is normalized to a unit-less quantity between 1 and 0 and is defined by the following equations:

$$MoistureDeviationIndex = \quad (Q)$$
$$Max\{Min[(MeasuredMoistureDeviation)(MoistureDeviationGain) + MoistureDeviationBias, 1], 0\}$$

$$Moisture\ DeviationGain = \frac{(MaxMoistureDeviationIndex - MinMoistureDeviatioIndex)}{(MinDesiredMoistureDeviation - MaxDesiredMoistureDeviation)} \quad (R)$$

$$MoistureDeviationBias = [MaxMoistureDeviationIndex - \quad (S)$$
$$(MinDesiredMoistureDeviation)(MoistureDeviationGain)].$$

The MeasuredMoistureDeviation variable identifies the actual moisture deviation, which is defined by the magnitude of the maximum moisture deviation from a target value that occurs during the operating transition time period. In addition, the MoistureDeviationChangeGain R identifies the desired change in the moisture deviation index per increase in actual moisture deviation, while the MoistureDeviationChangeBias S identifies the value of the maximum moisture deviation index when the actual moisture deviation is at the minimum moisture deviation.

Furthermore, the MaxDesiredMoistureDeviation and the MinDesiredMoistureDeviation values, from which the MoistureDeviationGain and MoistureDeviationBias are derived, define the respective maximum and minimum desired moisture deviation values and are acquired from historical data stored at the database 360 of the computer system 350 of one or more past grade changes performed by the process line 10.

The MaxDesiredMoistureDeviation and the MinDesiredMoistureDeviation can be entered directly into the computer system 350 or acquired in an automated manner from the database 360. The MaxMoistureDeviationIndex and the MinMoistureDeviationIndex identify the range of the MoistureDeviationIndex that is between the respective maximum and minimum moisture deviation indices, and is normally set such that the MaxMoistureDeviationIndex variable is equal to 1 and the MinMoistureDeviationIndex is equal to 0, so as to normalize the value of the MoistureDeviation Q.

It will, therefore, be appreciated that one advantage of one or more embodiments of the present invention is that a system for generating performance indices to quantify operating transition performance of a continuous process allows indices to be generated with sufficient resolution to allow a user to readily identify the portion of the process that is not attaining the desired performance levels. Another advantage of the present invention is that the performance indices quantify operating transition performance as a normalized, unit-less quantity that readily enables operating transition performance comparisons with other sheet forming process lines. Still yet another advantage of the present invention is that multiple, normalized operating transition performance indices are generated for specific portions of a continuous process to identify those portions of the process that are not attaining desired performance levels, so as to reduce product waste and production time associated with the manufacture of sheet products that are produced during the transition before its final specifications have been reached.

Although the present invention has been described in considerable detail with reference to certain embodiments, other embodiments are possible. Therefore, the spirit and scope of the appended claims should not be limited to the description of the embodiments contained herein.

What is claimed is:

1. A system for generating a performance index to quantify operating transition performance of a continuous process line that is carried out by a grade change control comprising:
    a database adapted to store at least one performance parameter stored thereon that is associated with an operating transition carried out by the grade change control during a transition time period; and
    a computer system coupled to said database, said computer system configured to generate a transition performance index based on said at least one operating parameter, wherein said transition performance index is derived from at least two performance indices selected from the group consisting of a transition time index, a sheet weight ramp index, a sheet weight change index, a line speed change index, a steam prediction error index, and a moisture deviation index, and wherein said at least two performance indices are weighted by a weight value.

2. The system of claim 1, wherein said overall transition performance index comprises the sum of a TransitionTimeIndex, a SheetWeightRampRateIndex, a SheetWeightChangeIndex, a LineSpeedChangeIndex, a SteamPredictionErrorIndex, and a MoistureDeviationIndex, such that said TransitionTimeIndex, said SheetWeightRampRateIndex, said SheetWeightChangeIndex, said LineSpeedChangeIndex, said SteamPredictionErrorIndex, and said MoistureDeviationIndex are each multiplied by respective weight values.

3. The system of claim 2, wherein the sum of said weight values is equal to 1.

4. The system of claim 2, wherein said TransitionTimeIndex comprises the sum of a TransitionTimeBias with the product of a MeasuredTime value and a TransitionTimeGain, wherein said MeasuredTime value is equal to a transition time period, said TransitionTimeGain is the desired change of said TransitionTimeIndex per increase in said MeasuredTime value, and said TransitionTimeBias is the value of said TransitionTimeIndex for a minimum transition time.

5. The system of claim 4, wherein said TransitionTimeGain comprises the difference between a MaxTimeIndex and a MinTimeIndex divided by the difference between a MinDesiredTime and a MaxDesiredTime, wherein said MaxTimeIndex is the maximum transition index time, said MinTimeIndex is the minimum transition index time, said MinDesiredTime is the minimum transition time, and said MaxDesiredTime is the maximum transition time.

6. The system of claim 5, wherein said TransitionTimeBias comprises the difference between said MaxTimeIndex and the product of said MinDesiredTime with said TransitionTimeGain.

7. The system of claim 2, wherein said SheetWeightRampRateIndex comprises the sum of a WeightRampRateBias and the product of a MeasuredWeightRampRate value with a WeightRampRateBias, wherein said MeasuredWeightRampRate is the weight ramp rate defined by the weight change divided by the transition time, said WeightRampRateGain is the desired change in the weight ramp rate index per increase in actual weight ramp rate, and said WeightRampRateBias is the value of the weight ramp rate index when the actual weight ramp rate is at the minimum ramp rate.

8. The system of claim 7, wherein said WeightRampRateGain comprises the difference between a Max WeightRampRateIndex and a MinWeightRampRateIndex divided by the difference between a MaxDesiredWeightRampRate and a MinDesiredWeightRampRate, wherein said MaxWeightRampRateIndex is the maximum weight ramp rate index, said MinWeightRampRateIndex is the minimum weight ramp rate index, said MinDesiredWeightRampRate is the minimum weight ramp rate, and said MaxDesiredWeightRampRate is the maximum weight ramp rate.

9. The system of claim 8, wherein said WeightRampRateBias comprises the difference between said MinWeightRampRateIndex and the product of said MinDesiredWeightRampRate with said WeightRampRateGain.

10. The system of claim 2, wherein said SheetWeightChangeIndex comprises the sum of a WeightChangeBias and the product of a MeasuredWeightChange value with a WeightChangeGain, wherein said MeasuredWeightChange is the actual weight change defined by magnitude of the difference between the before and after sheet weights of the sheet during the transition time period, said WeightChangeGain is the desired change in the weight change index per increase in actual weight of the sheet, and said WeightChangeBias is the value of the weight change index when the actual weight change is at a minimum weight ramp rate.

11. The system of claim 10, wherein said WeightChangeGain comprises the difference between a MaxWeightChangeIndex and a MinWeightChangeIndex divided by the difference between a MaxDesiredWeightChange and a MinDesiredWeightChange, wherein said MaxWeightChangeIndex is the maximum weight change index, said MinWeightChangeIndex is the minimum weight change index, said MaxDesiredWeightChange is the maximum desired weight change, and said MinDesiredWeightChange is the minimum desired weight change.

12. The system of claim 11, wherein said WeightChangeBias comprises the difference between said MinWeightChangeIndex and the product of said MinDesiredWeightChange with said WeightChangeGain.

13. The system of claim 2, wherein said LineSpeedChangeIndex comprises the sum of a SpeedChangeBias and the product of a MeasuredSpeedChange value with a SpeedChangeGain, wherein said MeasuredSpeedChange is the actual speed change of the sheet through the process line during a transition time period, said SpeedChangeGain is the desired change in the line speed change index per increase in actual sheet speed change, and said SpeedChangeBias is the value of the line speed change index when the sheet speed change is at the minimum speed change.

14. The system of claim 13, wherein said SpeedChangeGain comprises the difference between a MaxSpeedChangeIndex and a MinSpeedChangeIndex divided by the difference between a MaxDesiredSpeedChange and a MinDesiredSpeedChange, wherein said Max WeightChangeIndex is the maximum weight change index, said MinWeightChangeIndex is the minimum weight change index, said MaxDesiredWeightChange is the maximum desired weight change, and said MinDesiredWeightChange is the minimum desired weight change.

15. The system of claim 14, wherein said SpeedChangeBias comprises the difference between said MinSpeedChangeIndex and the product of said MinDesiredSpeedChange with said SpeedChangeGain.

16. The system of claim 2, wherein said SteamPredictionErrorIndex comprises the sum of a SteamPredictionErrorBias and the product of a MeasuredSteamPredictionError value with a SteamPredictionErrorGain, wherein said MeasuredSteamPredictionError is the actual steam pressure predication error defined by the difference between the actual new grade steady state steam pressure process value and a transition control predicted steam pressure value, said SteamPredictionErrorGain is the desired change in the steam prediction error index per increase in actual steam prediction error, and said SteamPredictionErrorBias is the value of the steam prediction error index when the actual steam prediction error is at a minimum steam prediction error.

17. The system claim 16, wherein said SteamPredictionErrorGain comprises the difference between a MaxSteamPredictionErrorIndex and a MinSteamPredictionErrorIndex divided by the difference between a MinDesiredSteamPredictionError and a MaxDesiredSteamPredictionError, wherein said MaxSteamPredictionErrorIndex is the maximum steam pressure prediction error index, said MinSteamPredictionErrorIndex is the minimum steam pressure prediction error index, said MaxDesiredSteamPredictionError is the maximum desired steam pressure prediction error, and said MinDesiredSteamPredictionError is the minimum desired steam pressure prediction error.

18. The system of claim 17, wherein said SteamPredictionErrorBias comprises the difference between said MaxSteamPredictionErrorIndex and the product of said MinDesiredSteamPredictionError with said SteamPredictionErrorGain.

19. The system of claim 2, wherein said MoistureDeviationIndex comprises the sum of a MoistureDeviationBias and the product of a MeasuredMoistureDeviation value with a MoistureDeviationGain, wherein said MeasuredMoistureDeviation is the magnitude of the actual deviation of the maximum moisture deviation from a target during the transition time period, said MoistureDeviationGain is the desired change in the moisture deviation index per increase in the actual moisture deviation, and said MoistureDeviationBias is the value of the maximum moisture deviation index when the actual moisture deviation is at a minimum moisture deviation.

20. The system of claim 19, wherein said MoistureDeviationGain comprises the difference between a MaxMoistureDeviationIndex and a MinMoistureDeviationIndex divided by the difference between a MinDesiredMoistureDeviation and a MaxDesiredMoistureDeviation, wherein said MaxMoistureDeviationIndex is the maximum moisture deviation index, said MinMoistureDeviationIndex is the minimum moisture deviation index, said MaxDesiredMoistureDeviation is the maximum desired moisture deviation, and said MinDesiredMoistureDeviation is the minimum desired moisture deviation.

21. The system of claim 20, wherein said MoistureDeviationBias comprises the difference between said MaxMoistureDeviationIndex and the product of said MinMoistureDeviation with said MoistureDeviationGain.

22. A method for generating a performance index to quantify operating transition performance of a continuous process that is carried out by a grade change control, the method comprising:
providing a computer system;
acquiring at least two performance indices at said computer system, said performance indices selected from the group consisting of a transition time index, a sheet weight ramp rate index, a sheet weight change index, a line speed change index, a steam prediction error index, and a moisture deviation index;
weighting each of said at least two indices by a weight value; and
summing said at least two performance indices to generate an operating transition performance index.

23. The method of claim 22, wherein the sum of said weight values equals 1.

24. The method of claim 22, wherein said transition time index comprises the sum of a TransitionTimeBias with the product of a MeasuredTime value and a TransitionTimeGain, wherein said MeasuredTime value is equal to a transition time period, said TransitionTimeGain is the desired change of said TransitionTimeIndex per increase in said MeasuredTime value, and said TransitionTimeBias is the value of said TransitionTimeIndex for a minimum transition time.

25. The method of claim 22, wherein said sheet weight ramp rate index comprises the sum of a WeightRampRateBias and the product of a MeasuredWeightRampRate value with a WeightRampRateBias, wherein said MeasuredWeightRampRate is the weight ramp rate defined by the weight change divided by the transition time, said WeightRampRateGain is the desired change in the weight ramp rate index per increase in actual weight ramp rate, and said WeightRampRateBias is the value of the weight ramp rate index when the actual weight ramp rate is at the minimum ramp rate.

26. The method of claim 22, wherein said sheet weight change index comprises the sum of a WeightChangeBias and the product of a MeasuredWeightChange value with a WeightChangeGain, wherein said MeasuredWeightChange is the actual weight change defined by magnitude of the difference between the before and after sheet weights of the sheet during the transition time period, said WeightChangeGain is the desired change in the weight change index per increase in actual weight of the sheet, and said WeightChangeBias is the value of the weight change index when the actual weight change is at a minimum weight ramp rate.

27. The method of claim 22, wherein said line speed change index comprises the sum of a SpeedChangeBias and the product of a MeasuredSpeedChange value with a SpeedChangeGain, wherein said MeasuredSpeedChange is the actual speed change of the sheet through the process line during a transition time period, said SpeedChangeGain is the desired change in the line speed change index per increase in actual sheet speed change, and said SpeedChangeBias is the value of the line speed change index when the sheet speed change is at the minimum speed change.

28. The method of claim 22, wherein said steam prediction error index comprises the sum of a SteamPredictionErrorBias and the product of a MeasuredSteamPredictionError value with a SteamPredictionErrorGain, wherein said MeasuredSteamPredictionError is the actual steam pressure predication error defined by the difference between the actual steady state steam pressure process value and a transition control predicted steam pressure value, said SteamPredictionErrorGain is the desired change in the steam prediction error index per increase in actual steam prediction error, and said SteamPredictionErrorBias is the value of the steam prediction error index when the actual steam prediction error is at a minimum steam prediction error.

29. The method of claim 22, wherein said moisture deviation index comprises the sum of a MoistureDeviationBias and the product of a MeasuredMoistureDeviation value with a MoistureDeviationGain, wherein said MeasuredMoistureDeviation is the magnitude of the actual deviation of the maximum moisture deviation from a target during the transition time period, said MoistureDeviationGain is the desired change in the moisture deviation index per increase in the actual moisture deviation, and said MoistureDeviationBias is the value of the maximum moisture deviation index when the actual moisture deviation is at a minimum moisture deviation.

* * * * *